United States Patent Office 3,445,581
Patented May 20, 1969

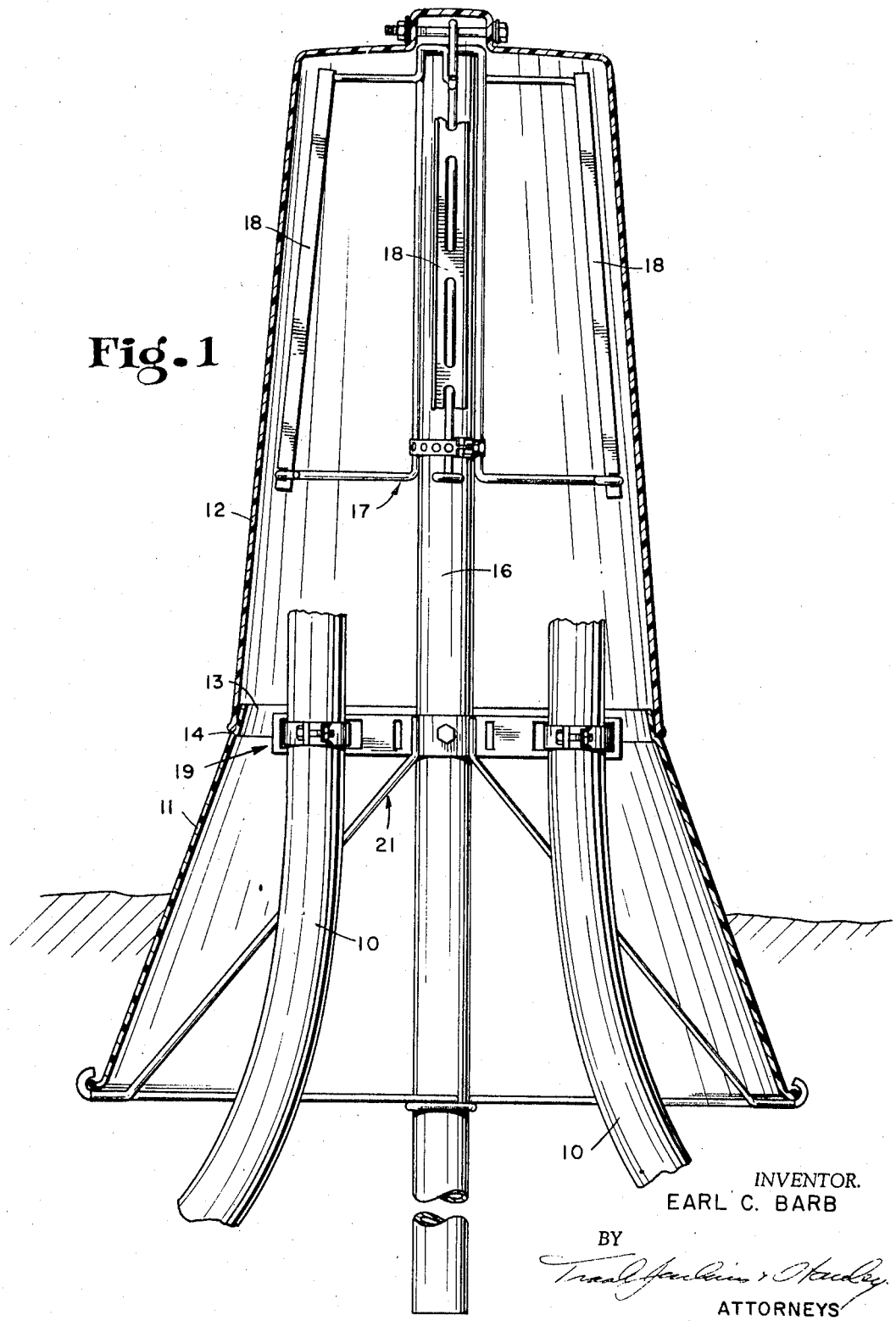

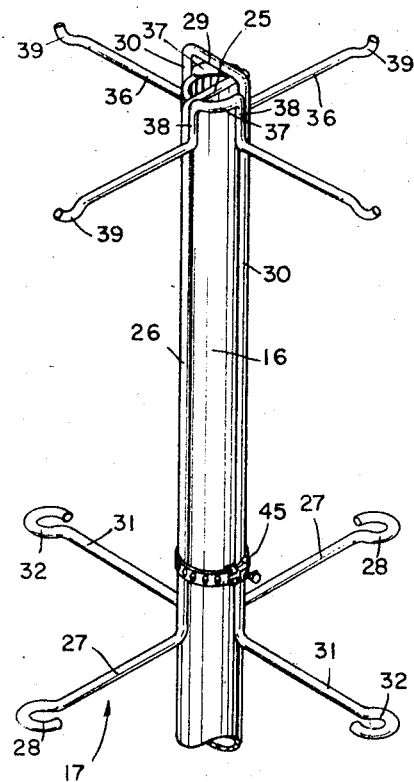
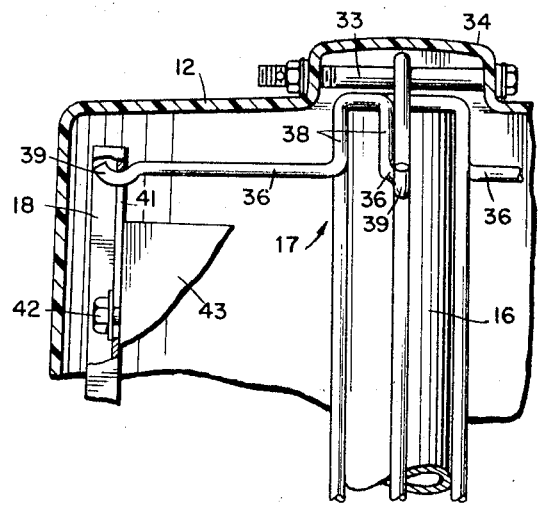
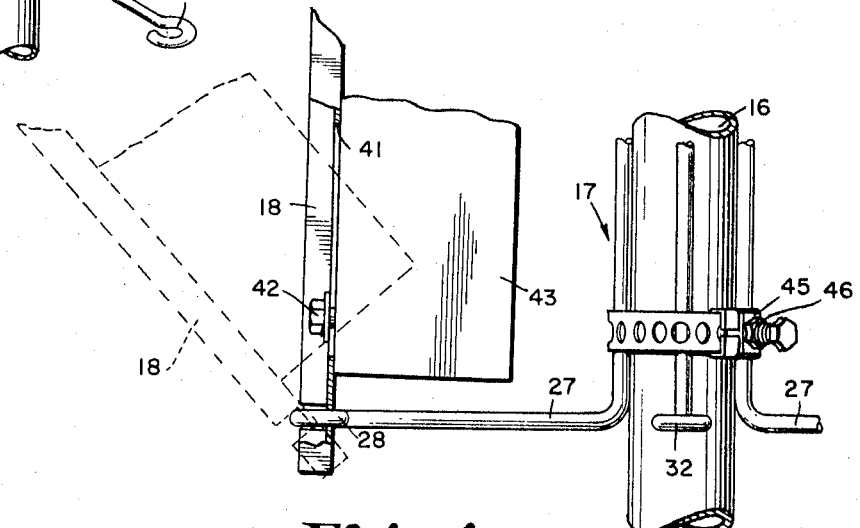

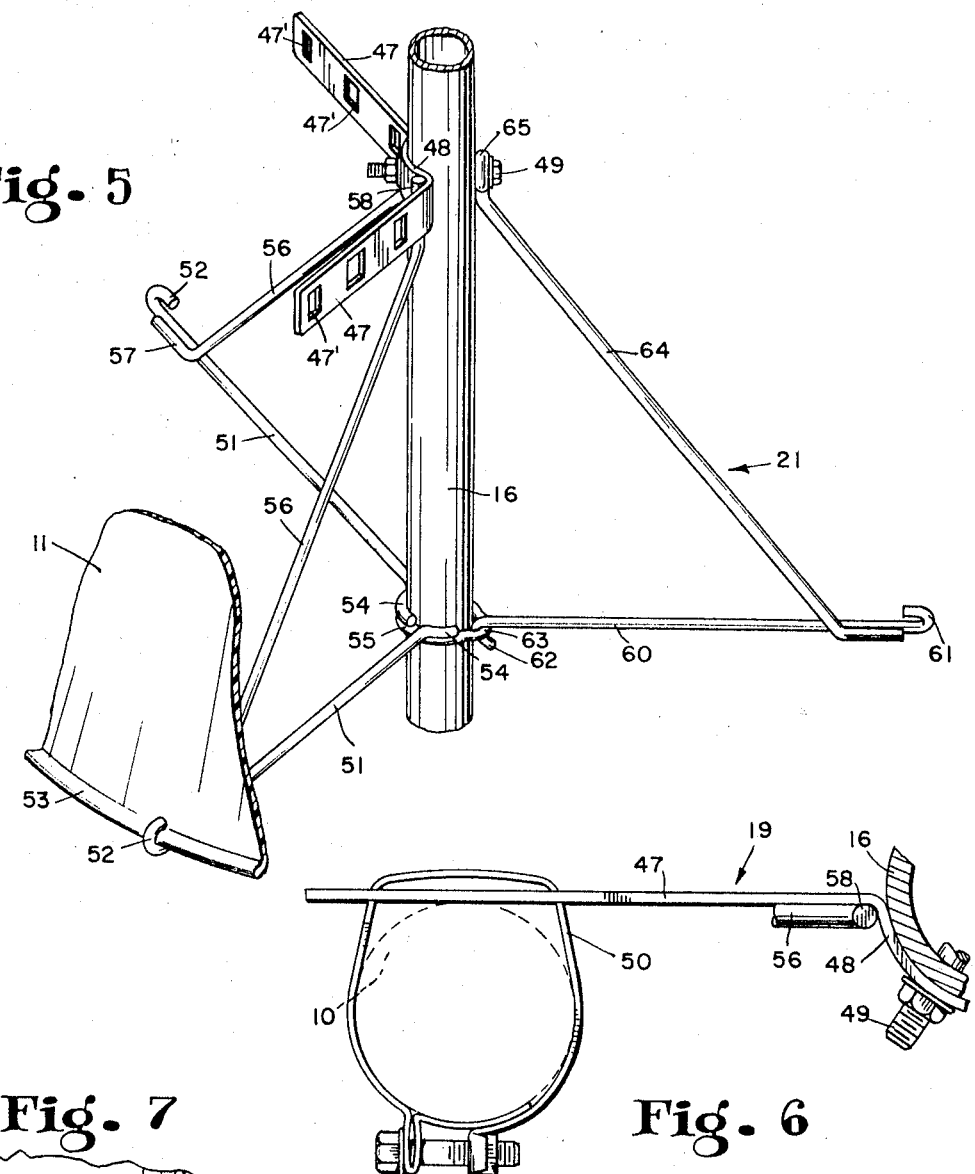
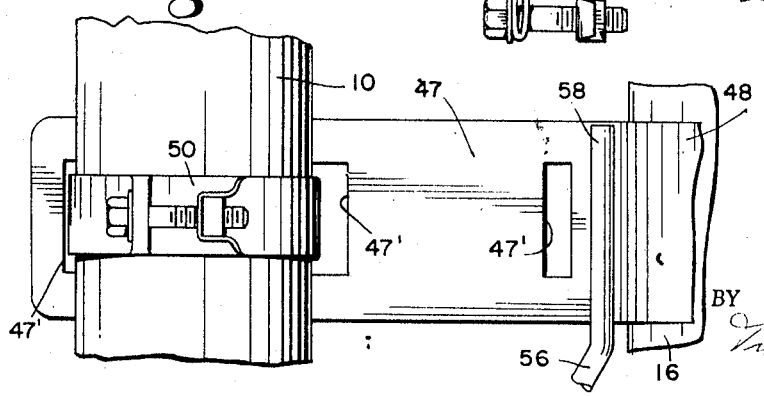

3,445,581
TERMINAL HOUSING FOR UNDERGROUND ELECTRICAL DISTRIBUTION SYSTEMS
Earl C. Barb, New Canaan, Conn., assignor to General Cable Corporation, New York, N.Y., a corporation of New Jersey
Filed June 21, 1966, Ser. No. 559,165
Int. Cl. H01b *17/56;* H01r *13/46*
U.S. Cl. 174—138                                      9 Claims

ABSTRACT OF THE DISCLOSURE

A terminal housing for use in underground electrical distribution systems comprises a circular shell buried in the ground for a portion of its height, a central post projecting upwardly through and beyond the shell, and a removable cover cooperating with the shell to enclose the post and elements supported on it. Such elements include a support for a cable emerging from the ground within the shell, locating means interconnecting the post and shell, and a common means for securing the locating means and cable support to the post. The locating means is a spider having a central ring surrounding the post and three radiating arms which terminate in hooks receiving the lower edge of the shell. Electrical components within the housing may be mounted on generally vertical mounting strips connected to the post through radiating arms which are elastically bendable to permit their ready disengagement from the mounting strips.

---

This invention relates to terminal housings of the kind commonly used, for example, to enclose and protect above-ground connections to conductors of underground cables. Such housings commonly embody a base structure, through which the cables are brought upwardly to a point above ground, and a removable cover cooperating with the base to provide an enclosure for one or more terminal blocks, loading coils, or other components supported from the base structure, and to or through which connections are to be made. The invention is primarily concerned with a housing which can accommodate relatively large cables containing as many as hundreds of conductors and which will provide space for the components and ready accessibility to the terminals where connections are to be effected.

A terminal housing embodying my invention in a preferred form comprises a central vertical post received within a housing comprising upper and lower parts. The lower housing part, which is partially buried in the ground, is in the form of a frusto-conical downwardly flaring shell against the upper end of which the lower end of the upper housing part abuts. The upper housing part is a vertically removable cover in the form of an inverted relatively deep cup, the side wall of which desirably flares downwardly, but to a lesser degree than the lower-housing part. Carried near the upper end of the post is a means for mounting a plurality of circumferentially spaced, generally vertical mounting strips each of which has affixed to it one or more terminal blocks or other components through or to which connections are to be effected. Each mounting strip is so supported that its upper end can be released and swung outwardly to facilitate access to the components it carries. Such result is conveniently made possible by supporting the strip from upper and lower arms projecting radially outwardly from the post, the outer end of the lower arm receiving the strip in a manner which permits the outward swinging, the upper arm being formed with a hook engageable with the upper end of the strip, and at least one of the arms being sufficiently resilient to permit engagement and disengagement of the hook.

Near the bottom of the cover there is secured to the post a cable-support comprising one or more radiating arms provided with means for clamping in place cables emerging from the ground into the housing. Associated with the cable support is a series of downwardly diverging, angularly spaced arms formed at their lower ends with hooks which engage the lower rim of the shell to establish a concentric relation between the shell and post. Desirably, such hooks open radially inwardly and the shell is provided at its bottom edge with an outwardly projecting annular flange and formed of material sufficiently resilient to permit the distortion necessary to engage the flange with the hooks.

Other features of the invention will become apparent from the following more detailed description and from the accompanying drawings, in which:

FIG. 1 is a vertical section through an installed housing;

FIG. 2 is an isometric view of a means for supporting the mounting strips;

FIG. 3 is a fragmental elevation of the upper portion of the means illustrated in FIG. 2 showing a mounting strip in place and, in section, a portion of the cover;

FIG. 4 is a view similar to FIG. 3 but showing the lower portion of the strip-mounting means;

FIG. 5 is an isometric view of the cable support and associated parts;

FIG. 6 is a fragmental plan view of the cable support; and

FIG. 7 is an elevation of the cable support shown in FIG. 6.

In the arrangement shown in FIG. 1, a pair of cable-stretches 10 emerging from below ground pass through a frustoconical shell 11 into a cover 12 in the form of an inverted, deep cup which cooperates with the shell 11 to form a housing enclosing the connections which are to be established. Preferably, the shell 11 is formed at its upper end and with an inwardly offset annular flange 13 which provides, at its lower edge, a shoulder 14 against which the lower edge of the cover 12 abuts. The shield and cover are desirably formed of some suitable corrosion-resistant material, preferably a glass-reinforced synthetic resin. Extending from below ground level through the shell to the top of the cover 12 is a central post 16 which, at its upper end, carries a support 17 for a plurality of circumferentially spaced mounting strips 18 to which terminal blocks or other components, not shown in FIG. 1, are to be attached.

Near the upper end of the shell 11, the post carries a support 19 to which the cable-stretches 10 may be secured. At about the same level, there is connected to the post a spider 21 with downwardly diverging arms, the lower ends of which engage the lower rim of the shell to maintain concentricity of the shell and post.

The support 17 for mounting strips 18 is shown in detail in FIGS. 2, 3, and 4. As there shown, the entire support is formed of resilient metal rods, conveniently stainless steel wire of about No. 8 gage. One piece of such wire is bent into the form of a deep U-shape providing a central portion 25 which extends diametrically across the upper end of the post 16 and two parallel legs 26 extending downwardly along opposite sides of the post for a substantial distance. The lower ends of the legs 26 are bent outwardly to form generally horizontal arms 27 projecting radially outwardly from the post and terminating in open eyes 28. A second piece of the wire is bent in similar fashion to provide a portion 29, legs 30 extending downwardly on opposite sides of the post 16, and outwardly projecting arms 31 terminating in eyes 32 which lie in a common horizontal plane with the eyes 28 on the arms 27. The only difference between the two wire elements so far described is that the legs 30 of the second element are somewhat longer than the legs 26 of the first element so that the central portion 29 of the second element will be spaced above the central portion 25 of the first element to permit reception below it of a bolt 33 extending through a hollow boss 34 formed at the top of the cover 12.

At the upper end of the support 17, it is provided with a series of radiating upper arms 36 which cooperate respectively with the lower arms 27 and 31 to support the mounting strips 18. As shown, the arms 36 are formed by a pair of similarly bent wires each having a central portion 37 extending chordally across the top of the post 16 between one of the vertical legs 26 and one of the vertical legs 30. The arms 36 are offset downwardly from the portion 37 to provide vertically extending portions 38 which lie against the adjacent legs 26 and 30 and are secured thereto, as by spot welding. At their outer ends, the arms 36 terminate in upwardly opening hooks 39 each located in the same vertical plane as one of the eyes 28, 32.

Extending between the outer end of each arm 36 and the outer end of the arm 27 or 31 lying under it is one of the mounting strips 18 above referred to. As shown, each of such mounting strips is a sheet-metal channel the web of which is provided with spaced longitudinally extending slots 41 for the reception of screws 42 by which terminal blocks 43 or other components may be secured to the mounting strip. At the lower end of each strip 18, the flanges thereof are notched and the web narrowed to an extent such as will permit the web to be inserted into an eye 28 or 32 and then rotated so that the web of the mounting strip will stand in opposed relation to the post 16. With the mounting strip in place, the upper end of its upper slot 41 is engaged by the associated hook 39, as shown in FIG. 3. The upper and lower arms of the mounting-strip support are sufficiently resilient to permit the hook 39 to be disengaged from the slot in the mounting strip; and the fit of the lower end of each mounting strip within its associated eye 28 or 32 is loose enough to permit the mounting strip, after its upper end is disengaged from the hook 39, to be swung outwardly as into the dotted-line position shown in FIG. 4. Such outward swinging of the mounting strip brings the components 43 which it carries out from between similar components carried by adjacent mounting strips and renders readily accessible the terminals on such components. If desired for the purpose of still further facilitating access to such terminals, any mounting strip can be completely freed from its support by rotating it slightly about its longitudinal axis and slipping its lower end out of the associated eye.

The mounting-strip support 17 is secured to the post 16 by a clamp 45, which may be a conventional type of hose clamp located just above the arms 27, 31 and embracing all the vertical support-legs 26, 30. Desirably, such clamp is of the type having a radially disposed clamping screw provided with a lock-nut 46 adapting it to serve as a ground terminal for connection to any cable-conductors which are to be grounded.

The cable support 19, carried by the post 16 below the mounting-strip support 17, is illustrated in FIGS. 5, 6, and 7. As there shown, such cable support comprises a metal strip bent to form two radiating end portions 47 and a center portion 48 curved to conform to the outer surface of the post 16. A bolt 49 passing through such central portion 48 and the post serves to secure the cable-support in place. For the purpose of securing cables to the support-arms 47 each of the latter is provided with a series of radially spaced slots 47' adapted to receive a cable-embracing clamp 50, as shown in FIGS. 6 and 7.

The spider 21, which establishes and maintains concentricity between the shell 11 and post 16, comprises a pair of arms 51 which radiate outwardly from the post 16 and are formed at their outer ends with inwardly opening hooks 52 engaged with an annular flange 53 provided on the lower rim of the shell 11. At their inner ends, each of the arms 51 is shown as bent to provide an arcuately formed extension 54 which overlies and is secured to a ring 55 slidably surrounding the post 16. Each of the arms 51 has associated with it an upwardly and inwardly extending brace 56 secured at its inner end to the post 16 and at its lower end to the arm 51. Conveniently, each brace 56 has its lower end 57 bent to extend for a distance along and be welded to the associated arm 51 near the hook 52 thereon. The upper ends of the braces 56 may be secured to the post 16 by providing them with vertically extending end portions 58 each of which is received in a bend between an arm 47 and the central portion 48 of the cable support. Conveniently, the rods 51 and braces 56 are formed of material similar to that used in forming the mounting-strip support 17, and the ends of the braces are spot-welded to the arms 51 and the cable support.

A third horizontal arm 60 of the spider 21 is formed at its outer end with a hook 61 similar to the hooks 52 and at its inner end with a hook 62 engageable in an outwardly offset portion 63 of the ring 55. A brace 64, secured to the arm 60 near the outer end thereof, extends upwardly and inwardly and terminates in an eye 65 lying against the post 16 in position to receive the bolt 49.

In installing the housing, a hole is dug in the ground at the location of the emerging cable stretches 10, the hole being large enough to receive the lower end of the shell 11 and having a depth of approximately half the height of such shell. The post 16 is then driven into the ground at the center of the hole. After the hook 62 on the inner end of the arm 60 has been engaged in the offset 63 on the ring 55, the hooks 52 and 61 are engaged with the rim of the shell 11, the ring 55 is slipped over the upper end of the post, the shell and spider 21 are lowered on the post to position the shell in surrounding relation to the cable-stretches 10, and the spider and cable support 19 are secured to the post by application of the bolt 49. If the shell is formed of the preferred glass-reinforced synthetic resin, it will possess sufficient flexibility to permit its distortion to the extent necessary to engage its rim with the hooks 52 and 61. After the shell and spider have been positioned by tightening of the bolt 49, the cable stretches 10 may be clamped to the supporting arms by application of the clamps 50, and the space around and within the shell is filled to ground level, or slightly above to inhibit accumulation of surface water. The mounting strip support 17 is slipped over the top of the post and lowered thereon until the portion 25 engages the top of the post, whereupon the clamp 45 is applied to secure the support 17 in place. After the desired connection between cable conductors and components 43 have been effected and the mounting strips 18 secured in place in the support, the cover 12 is lowered into engagement with the shoulder 14 on the shell 11 and the bolt 33 is applied as shown in FIG. 3 to hold the cover in place.

I claim:

1. A terminal housing for use in association with underground, multiconductor cables, comprising:

A shell buried in the ground for a portion of its height and open at its top and bottom to permit passage of a cable through it, a post extending from the ground through and upwardly beyond said shell, means interconnecting the shell and post for maintaining them in predetermined relative position, supporting means carried by said post near its upper end for supporting components to which conductors of the cable are to be connected, a cable support mounted on said post below said supporting means, a common means for releasably securing said cable support and interconnecting means to the post.

a removable cover enclosing the upper portion of the post and said supporting means and having a lower end engaged with the upper end of said shell, and releasable means for retaining said cover in position on the shell.

2. A terminal housing for use in association with underground, multiconductor cables, comprising:

a shell buried in the ground for a portion of its height, open at its top and bottom to permit passage of a cable through it, and having at its lower end an outwardly projecting peripheral flange, a post extending from the ground through and upwardly beyond said shell, means interconnecting the shell and post for maintaining them in predetermined relative position and comprising a spider having a central portion secured to the post and at least three radiating arms terminating at their outer ends in inwardly opening hooks receiving said flange, said shell being sufficiently elastically deformable to permit engagement of said flange in said hooks, supporting means carried by said post near its upper end for supporting components to which conductors of the cable are to be connected, a removable cover enclosing the upper portion of the post and said supporting means and having a lower end engaged with the upper end of said shell, and releasable means for retaining said cover in position on the shell.

3. A terminal housing for use in association with underground, multiconductor cables, comprising:

a shell buried in the ground for a portion of its height and open at its top and bottom to permit passage of a cable through it, a post extending from the ground through and upwardly beyond said shell, means interconnecting the shell and post for maintaining them in predetermined relative position and comprising a spider having a ring embracing said post and at least three arms radiating from said ring and connected at their outer ends to the lower edge of the shell, the inner ends of two of said arms being fixedly secured to said ring and the inner end of a third arm being detachably connected to the ring, said spider also including for each arm an upwardly and inwardly extending brace having its lower end connected to the associated arm and its upper end connected to the post, supporting means carried by said post near its upper end for supporting components to which conductors of the cable are to be connected, a removable cover enclosing the upper portion of the post and said supporting means and having a lower end engaged with the upper end of said shell, and releasable means for retaining said cover in position on the shell.

4. A terminal housing for use in association with underground, multiconductor cables, comprising:

a vertically extending post, pairs of radially projecting arms carried by said post near its upper end, the two arms of each pair being vertically spaced and the pairs of arms being angularly spaced about the post, a mounting strip for each pair of arms extending between the outer ends of the arms and supported thereby, each of said mounting strips being adapted to support a component to be connected to cable conductors, being releasably connected to one of its associated arms and, upon release from such arm, swingable outwardly about its connection to the other of its associated arms, and a casing for enclosing said post, arms, mounting strips and a cable portion emerging from the ground, said casing including a cover removable to expose and permit access to components carried by said mounting strips.

5. A terminal housing according to claim 4 wherein each mounting strip is provided at one end with an opening engageable with a hook at the outer end of the adjacent arm, at least one of each pair of arms being sufficiently resilient to permit engagement and disengagement of the hook with the opening.

6. A terminal housing according to claim 4 wherein one of said arms has at its outer end a horizontally disposed open eye into which the associated mounting strip can be inserted by lateral movement, the adjacent end of the mounting strip being provided with a notch which, when the strip is in the eye, locates the strip vertically.

7. A terminal housing for use in association with underground, multiconductor cables, comprising:

a vertically extending post, pairs of radially projecting arms carried by said post near its upper end, the two arms of each pair being vertically spaced and the pairs of arms being angularly spaced about the post, said pairs of arms including two lower arms projecting in opposite directions from diametrically opposite sides of the post and constituting the end portions of a single rod bent to provide, in addition to the arms, a central portion extending across the top of the post and two vertical portions extending downwardly along opposite sides of the post from said central portion and joining at their lower ends the respective inner ends of said oppositely projecting lower arms, a mounting strip for each pair of arms extending between the outer ends of the arms and suppotred thereby, each of said mounting strips being adapted to support a component to be connected to cable conductors, and a casing for enclosing said post, arms, mounting strips and a cable portion emerging from the ground, said casing including a cover removable to expose and permit access to components carried by said mounting strips.

8. A terminal housing according to claim 7 wherein said central rod-portion is spaced upwardly from the top of the post, said cover having the form of an inverted cup and being held in place by a bolt passing between said vertical rod-portions beneath said central rod-portion.

9. A terminal housing for use in association with underground, multiconductor cables, comprising:

a vertically extending post, four pairs of radially projecting arms carried by said post near its upper end with the two arms of each pair being vertically spaced, said arms forming parts of a unitary sub-assembly adapted to receive the upper portion of said post, said sub-assembly comprising, a first rod bent to provide a central portion extending across the top of the post, two vertical portions extending downwardly on opposite sides of the post, and outwardly projecting aligned end portions constituting two lower arms, a second rod bent to provide a central portion crossing the central portion of said first rod, two vertical portions extending downwardly on opposite sides of the post spaced angularly from the vertical portions of the first rod, and outwardly projecting, aligned end portions constituting two lower arms, and third and fourth rods each bent to provide a horizontal central portion, two vertical portions disposed against and fixedly secured to two adjacent vertical portions of the first and second rods, and end portions projecting outwardly over two adjacent lower arms and constituting upper arms, a mounting strip for each pair of arms extending between the outer ends of the arms and supported thereby, each of said mounting strips being adapted to support a component to be connected to cable conductors, and a casing for enclosing said post, arms, mounting strips and a cable portion emerging from the ground, said casing including a cover removable to expose and permit access to components carried by said mounting strips.

References Cited

UNITED STATES PATENTS

| | | | |
|---|---|---|---|
| 279,646 | 6/1883 | Hamilton | 174—38 |
| 2,184,574 | 12/1939 | Addie | 174—37 X |
| 3,162,718 | 12/1964 | Gunthel | 174—38 |
| 3,268,651 | 8/1966 | Stevenson | 174—38 |
| 3,375,620 | 4/1968 | Phillips | 174—38 X |

FOREIGN PATENTS 14,013  1995  Great Britain.

LARAMIE E. ASKIN, *Primary Examiner.*

U.S. Cl. X.R.

174—60